(12) United States Patent
DeGowske et al.

(10) Patent No.: US 9,174,632 B2
(45) Date of Patent: Nov. 3, 2015

(54) HYDRAULICALLY OPERATED CLUTCH

(71) Applicant: American Axle & Manufacturing, Inc., Detroit, MI (US)

(72) Inventors: Robert J. DeGowske, Fair Haven, MI (US); Charles G. Stuart, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 198 days.

(21) Appl. No.: 14/077,763

(22) Filed: Nov. 12, 2013

(65) Prior Publication Data

US 2015/0133266 A1 May 14, 2015

(51) Int. Cl.

| F16D 25/06 | (2006.01) |
| B60W 10/02 | (2006.01) |
| B60W 10/119 | (2012.01) |
| F16D 48/02 | (2006.01) |

(52) U.S. Cl.
CPC ...... B60W 10/119 (2013.01); *F16D 2048/0245* (2013.01)

(58) Field of Classification Search
CPC ...... B60K 17/16; B60W 10/02; B60W 10/23; B60W 10/119; F16D 25/06; F16D 25/062; F16D 25/063; F16D 25/0635; F16D 25/0638; F16D 25/14; F16D 21/04; F16D 2048/0245; F16D 2048/0248; F04B 35/04; F04B 49/00; F04B 49/22
See application file for complete search history.

(56) References Cited

U.S. PATENT DOCUMENTS

| 2,366,388 | A | 1/1945 | Crosby |
| 3,864,911 | A | 2/1975 | Gellatly et al. |
| 4,008,571 | A | 2/1977 | Evans |
| 4,833,971 | A | 5/1989 | Kubik |
| 6,886,332 | B2 | 5/2005 | Kubinski et al. |
| 7,493,757 | B2 | 2/2009 | Kurz et al. |
| 7,546,730 | B2 | 6/2009 | Kubinski |
| 2007/0175721 | A1 | 8/2007 | Nett et al. |
| 2009/0032359 | A1 | 2/2009 | Asano |
| 2009/0044951 | A1 | 2/2009 | Milkovisch et al. |
| 2010/0322791 | A1 | 12/2010 | Wadsley et al. |
| 2011/0176932 | A1 | 7/2011 | Schultz et al. |
| 2013/0192948 | A1 | 8/2013 | Rothvoss et al. |

OTHER PUBLICATIONS

International Search Report and Written Opinion of the International Searching Authority, mailed Feb. 25, 2015; ISA/KR.

*Primary Examiner* — Jacob S Scott
(74) *Attorney, Agent, or Firm* — Harness, Dickey & Pierce, P.L.C.

(57) ABSTRACT

The present teachings provide for a power transmitting component including a friction clutch, a reservoir, a hydraulic ram to actuate the clutch, a motor, and first and second pumps simultaneously driven by the motor. The first pump is in fluid communication with the reservoir and the ram. The first pump is configured to provide hydraulic fluid to the ram when the motor rotates in a first direction. The second pump is coupled to the reservoir and provides hydraulic fluid to the ram when the output shaft rotates in the first direction and a pressure differential between the ram and the second pump is less than or equal to a predetermined pressure differential. The second pump has a displacement greater than the first pump and is configured to provide hydraulic fluid to the ram at a lower pressure and higher flow rate than the first pump.

20 Claims, 2 Drawing Sheets

HYDRAULICALLY OPERATED CLUTCH

FIELD

Figure 1:
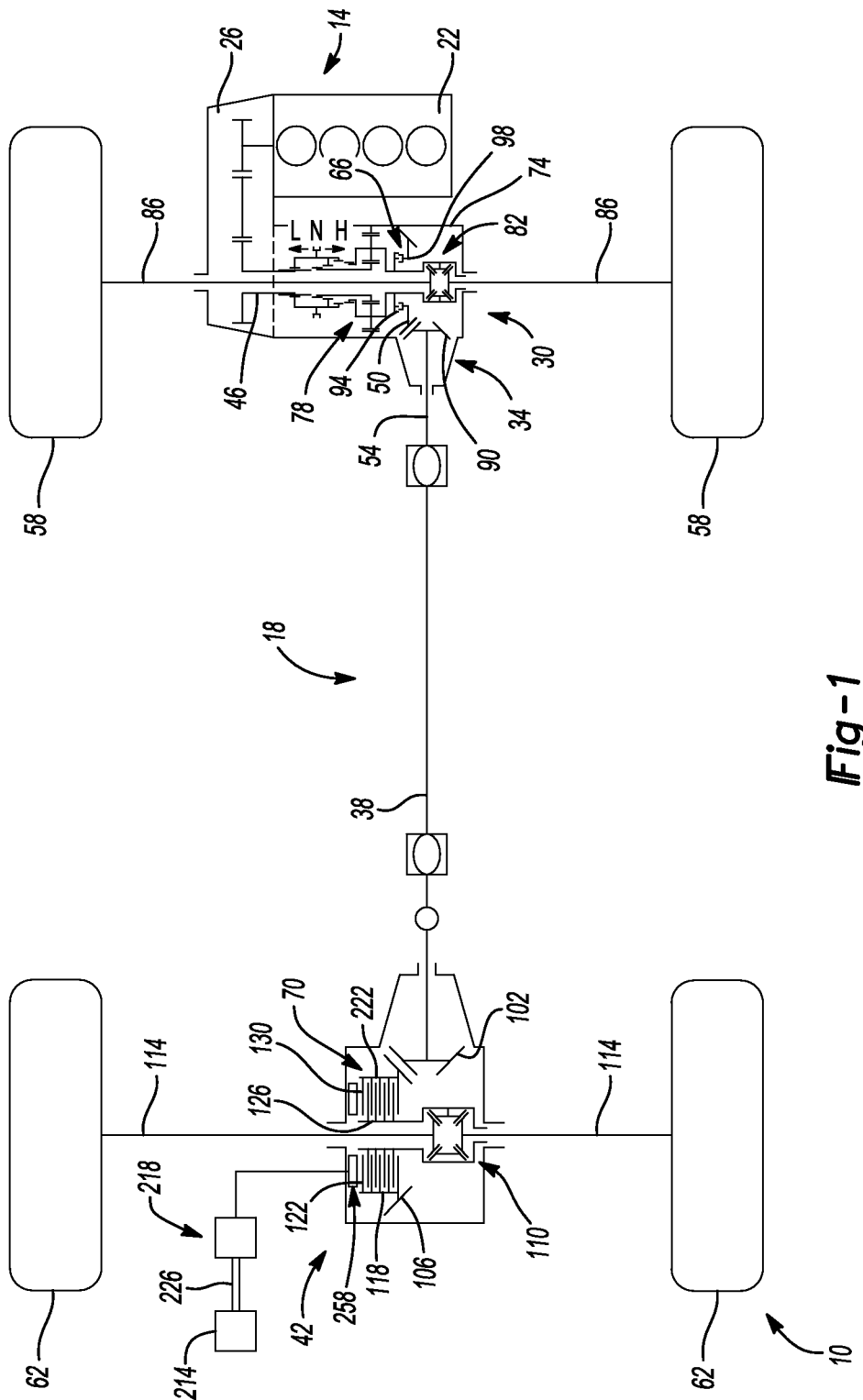

The present disclosure relates to hydraulically operated clutches.

BACKGROUND

This section provides background information related to the present disclosure which is not necessarily prior art.

Hydraulically operated clutches generally include a piston which applies force to the clutch system to engage the clutch plates. In order for the clutch plates to reach maximum separation for low drag torque, the piston must retract a considerable distance from the point of engagement. Typically, for the piston to move from the fully retracted position to engage the clutch plates quickly, a high flow of hydraulic fluid to the piston is required during this initial actuation. As the clutch plates are not engaged during this initial movement of the piston, the fluid can be provided at a lower pressure. Once the clutch plates begin to engage, the piston has less distance to travel before the clutch is fully engaged, thus the high flow rate is no longer needed. Instead, a higher pressure is required to force the clutch plates into complete engagement.

Typically, the pressure developed by a fixed displacement hydraulic pump, such as a gerotor for example, is directly related to the pump's input torque, and inversely related to the pump's fluid displacement, while the flow rate is directly related to the pump's fluid displacement and rotational speed. As a result, it can be difficult to satisfy requirements for low power consumption, high flow rate, and high pressure, while simultaneously the maintaining simplicity, low cost, and robustness of a fixed displacement pump.

SUMMARY

This section provides a general summary of the disclosure, and is not a comprehensive disclosure of its full scope or all of its features.

The present teachings provide for a power transmitting component including a friction clutch, a reservoir, a hydraulic ram, a motor, a first pump and a second pump. The friction clutch has a plurality of first clutch plates and a plurality of second clutch plates that are interleaved with the first clutch plates. The reservoir is configured to hold a hydraulic fluid. The hydraulic ram is coupled to the friction clutch. The hydraulic ram has a chamber and a piston that is movable in the chamber between a first position and a second position. In the first position, the piston is retracted relative to the first and second clutch plates. In the second position, the piston is extended toward the first and second clutch plates to a greater extent than when the piston is in the first position. The motor has an output shaft that is rotatable in a first rotational direction. The first pump is driven by the output shaft and has first and second ports. The first port is coupled in fluid communication to the reservoir. The second port is coupled in fluid communication to the chamber. The first pump has a first displacement and is configured to provide hydraulic fluid of a first pressure and first flow rate from the second port when the output shaft rotates in the first rotational direction. The second pump is driven by the output shaft and has third and fourth ports. The third port is coupled to the reservoir. The fourth port is coupled to the chamber. The second pump provides hydraulic fluid to the chamber when the output shaft rotates in the first rotational direction and a first pressure differential between the chamber and the fourth port is less than or equal to a first predetermined pressure differential. The second pump has a second displacement greater than the first displacement and is configured to provide hydraulic fluid of a second pressure and second flow rate from the fourth port when the output shaft rotates in the first rotational direction. The second pressure is less than the first pressure and the second flow rate is greater than the first flow rate. The first and second pumps are simultaneously driven by the output shaft.

The present teachings further provide for a power transmitting component including a friction clutch, a reservoir, a hydraulic ram, an isolation circuit, a motor, a first pump, a second pump, and a first valve. The friction clutch has a plurality of first clutch plates and a plurality of second clutch plates that are interleaved with the first clutch plates. The reservoir is configured to hold hydraulic fluid. The hydraulic ram has a chamber and a piston that is movable in the chamber between a first position and a second position. In the first position, the piston is retracted relative to the first and second clutch plates. In the second position, the piston is extended toward the first and second clutch plates to a greater extent than when the piston is in the first position. The isolation circuit is coupled for selective fluid communication to the reservoir and the chamber. The motor has an output shaft that is driven by the motor in a first rotational direction. The first pump is driven by the output shaft and has a first port and a second port. The first port is coupled in fluid communication to the reservoir. The second port is coupled in fluid communication to the chamber. The first pump has a first displacement and is configured to provide hydraulic fluid of a first pressure and first flow rate from the second port when the output shaft rotates in the first rotational direction. The second pump is driven by the output shaft and has third and fourth ports coupled in fluid communication to the isolation circuit. The second pump has a second displacement and is configured to provide hydraulic fluid of a second pressure and second flow rate from the fourth port when the output shaft rotates in the first rotational direction. The second flow rate is greater than the first flow rate, and the second pressure is less than the first pressure. The first valve is between the isolation circuit and the hydraulic ram. The first valve allows fluid communication between the isolation circuit and the chamber when a first pressure differential between the chamber and the isolation circuit is less than or equal to a first predetermined pressure differential, and prevents fluid communication when the first pressure differential is greater than the first predetermined pressure differential. The second pump circulates hydraulic fluid in a portion of the isolation circuit when the first pressure differential is greater than the first predetermined pressure differential.

The present teachings also provide for a power transmitting component including a friction clutch, a hydraulic ram, a reservoir, an isolation circuit, a motor, a high-pressure low-displacement pump, and a low-pressure high-displacement pump. The friction clutch has a plurality of first clutch plates and a plurality of second clutch plates that are interleaved with the first clutch plates. The hydraulic ram is coupled to the friction clutch. The hydraulic ram has a chamber and a piston that is movable in the chamber between a first position and a second position. In the first position, the piston is retracted relative to the first and second clutch plates. In the second position, the piston is extended toward the first and second clutch plates to a greater extent than when the piston is in the first position. The reservoir is configured to hold a hydraulic fluid. The motor has an output shaft that is selectively rotatable in a first rotational direction and a second rotational direction that is opposite the first rotational direction. The high-pressure, low-displacement pump is driven by the output shaft. A first input/output of the high-pressure, low-displacement pump is coupled in fluid communication to the reservoir. A second input/output of the high-pressure, low-displacement pump is coupled in fluid communication to the chamber. The low-pressure, high-displacement pump is driven by the output shaft and has a third input/output and a fourth input/output. The third and fourth input/outputs are coupled in fluid communication with the isolation circuit. When the output shaft is driven in the first rotational direction and a pressure differential between hydraulic fluid output from the fourth input/output and hydraulic fluid in the chamber is less than or equal to a predetermined pressure differential, the isolation circuit permits fluid communication between the fourth input/output and the chamber and permits fluid communication between the reservoir and the third input/output. When the output shaft is driven in the first rotational direction and the pressure differential between hydraulic fluid output from the fourth input/output and hydraulic fluid in the chamber is greater than the predetermined pressure differential, the isolation circuit inhibits fluid communication between the fourth input/output and the chamber, and permits fluid communication between the reservoir and the third input/output when a pressure of hydraulic fluid entering the third input/output is less than a second predetermined pressure. When the output shaft is driven in the second rotational direction, the low-pressure, high-displacement pump recirculates hydraulic fluid within a portion of the isolation circuit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
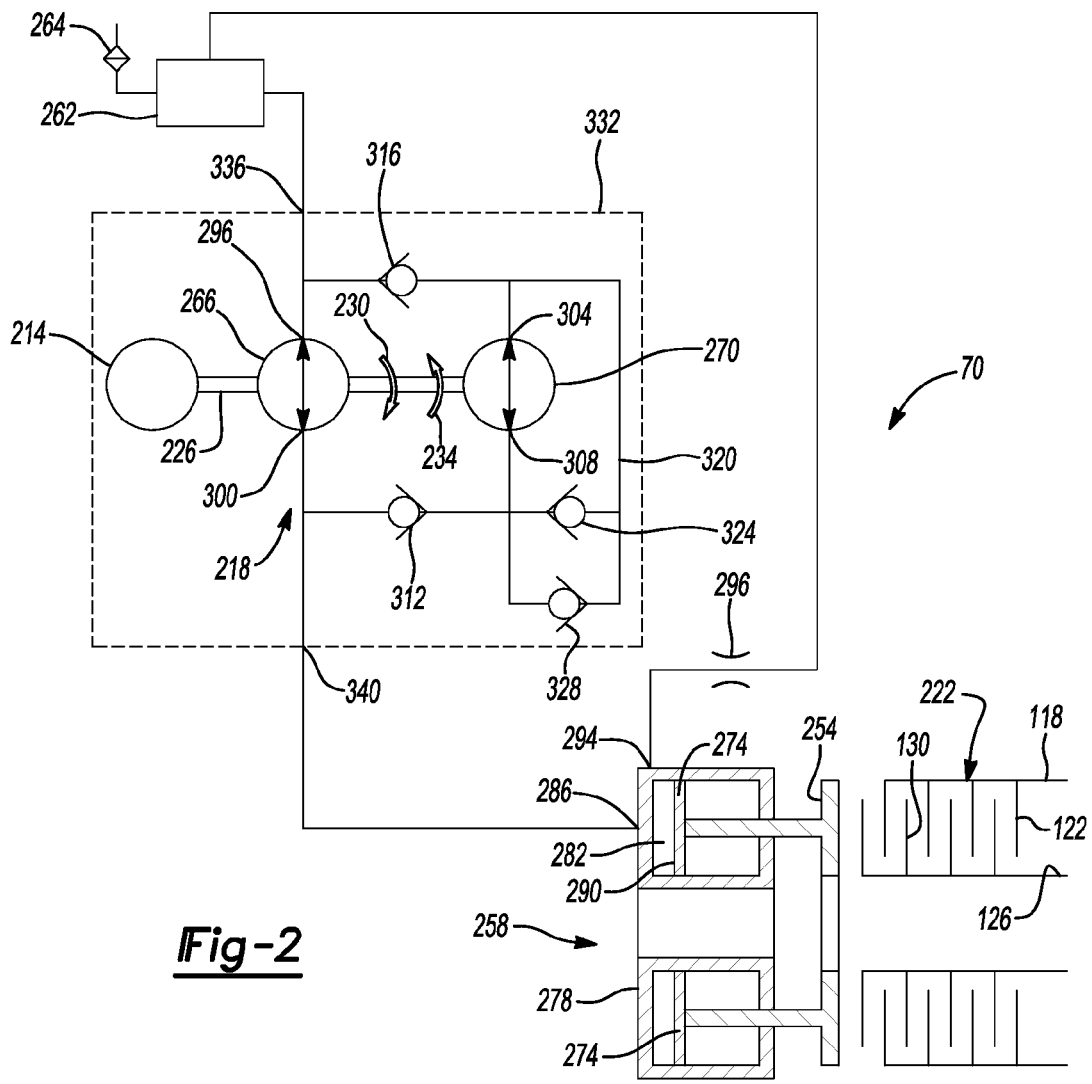

FIG. 1 is an exemplary vehicle having a power transmitting component constructed in accordance with the present teachings; and FIG. 2 is a schematic illustration of the power transmitting component of FIG. 1.

Corresponding reference numerals indicate corresponding parts throughout the several views of the drawings.

DETAILED DESCRIPTION

Example embodiments will now be described more fully with reference to the accompanying drawings.

With reference to FIG. 1 of the drawings, an exemplary vehicle having clutches that can be actuated by a power transmitting component constructed in accordance with the teachings of the present disclosure is generally indicated by reference numeral 10. The vehicle 10 can have a power train 14 and a drive line or drive train 18. The power train 14 can be conventionally constructed and can comprise a power source 22 and a transmission 26. The power source 22 can be configured to provide propulsive power and can comprise an internal combustion engine and/or an electric motor, for example. The transmission 26 can receive propulsive power from the power source 22 and can output power to the drive train 18. The transmission 26 can have a plurality of automatically or manually-selected gear ratios. The drive train 18 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations.

The drive train 18 can include a front axle assembly 30, a power take-off unit (PTU) 34, a prop shaft 38 and a rear axle assembly 42. An output of the transmission 26 can be coupled to an input of the front axle assembly 30 to drive an input member 46 of the front axle assembly 30. The PTU 34 can have a PTU input member 50, which can receive rotary power from the input member 46 of the front axle assembly 30, and a PTU output member 54 that can transmit rotary power to the prop shaft 38. The prop shaft 38 can couple the PTU output member 54 to the rear axle assembly 42 such that rotary power output by the PTU 34 is received by the rear axle assembly 42. The front axle assembly 30 and the rear axle assembly 42 could be driven on a full-time basis to drive front and rear vehicle wheels 58 and 62, respectively. It will be appreciated, however, that the drive train 18 could include one or more clutches to interrupt the transmission of rotary power through a part of the drive train 18. In the particular example provided, the drive train 18 include a first clutch 66, which can be configured to interrupt the transmission of rotary power into or through the PTU 34, and a power transmitting component 70, which can be configured to control rotation of components within the rear axle assembly 42. The power transmitting component 70 can include a second clutch 222, a motor 214, a hydraulic circuit 218.

The front axle assembly 30, the PTU 34 and the first clutch 66 can be mounted in a housing assembly 74. The front axle assembly 30 can include the input member 46, a two-speed transmission 78, a front differential assembly 82 and a pair of front axle shafts 86. The input member 46 can be a hollow shaft that can be configured to engage with the output member of the transmission 26. The input member 46 can be configured to engage with the two-speed transmission 78. The two-speed transmission 78 can be configured to engage the first clutch 66 and the front differential assembly 82.

The front differential assembly 82 can be coupled to the front axle shafts 86 and permit speed differentiation between the front axle shafts 86. In the example provided, the front differential assembly 82 is an open differential. It will be appreciated, however, that other speed differentiation means could be employed in the alternative, such as one or more clutches, a locking differential or a limited slip differential.

The PTU 34 can include the PTU input member 50, a pinion gear 90 and the PTU output member 54. The PTU input member 50 can comprise a bevel ring gear that is mounted in the housing assembly. The pinion gear 90 can be meshingly engaged to the bevel ring gear of the PTU input member 50 and can be aligned along an axis that is generally perpendicular to the rotational axis of the input member 46. If desired, the pinion gear 90 can be a hypoid pinion gear. The PTU output member 54 can be coupled to the pinion gear 90 for rotation therewith.

The first or mode clutch 66 can be any type of clutch, including a friction clutch or a synchronizer. In the particular example provided, the mode clutch 66 is a dog clutch having a clutch input member 94 and a clutch output member 98. The clutch input member 94 can be coupled to the two-speed transmission 78 for rotation therewith. The clutch output member 98 can be non-rotatably coupled to the bevel ring gear of the PTU input member 50. The mode clutch 66 can be operable for selectively transmitting rotary power between the clutch input member 94 and the clutch output member 98.

The rear axle assembly 42 can include an input pinion 102, a bevel ring gear 106, a second differential assembly 110, a pair of second shafts 114, and the power transmitting component 70. The input pinion 102 can be coupled to an end of the propshaft 38 for rotation therewith. The second bevel ring gear 106 being meshed with the input pinion 102. The second differential assembly 110 can be configured to receive rotary power transmitted through the second bevel ring gear 106 and to transmit that rotary power to the second shafts 114. The second differential assembly 110 can have a means for permitting speed differentiation between the second shafts 114. In the example provided, the speed differentiation means comprises an open differential. The second clutch or axle disconnect clutch 222 of the power transmitting component 70 can be configured to selectively interrupt power transmission through the second differential assembly 110. The axle disconnect clutch 222 can be any type of clutch and can be mounted coaxially with the second differential assembly 110. In the particular example provided, the axle disconnect clutch 222 includes a clutch input member 118 that is coupled to the bevel ring gear 106 for rotation therewith, a plurality of first friction plates 122 that are non-rotatably coupled to the clutch input member 118, a clutch output member 126, which is coupled to the second differential assembly 110 to provide rotary power thereto, a plurality of second friction plates 130, which are non-rotatably coupled to the clutch output member 126, and an actuator 258. The first and second friction plates 122 and 130 can be interleaved and the actuator 258 can be employed to compress the first and second friction plates 122 and 130 so that they frictionally engage one another so that rotary power can be transmitted from the bevel ring gear 106 through the axle disconnect clutch 222 and to the second differential assembly 110. When the actuator 258 is disengaged so that rotary power is not transmitted through the axle disconnect clutch 222, the rear wheels 62 will drive the second shafts 114, but the axle disconnect clutch 222 inhibits the transmission of rotary power into the bevel ring gear 106. In this way, operation of the vehicle 10 in a front-wheel drive mode will not permit the rear wheels 62 to "back drive" the bevel ring gear 106.

With reference to FIG. 2 of the drawings, the power transmitting component 70 is illustrated in more detail. The motor 214 can have an output shaft 226 that is rotatable in a first direction 230. The motor 214 can be reversible to rotate the output shaft 226 in a second direction 234 opposite the first direction 230.

The actuator 258 can include an apply plate 254 and can be selectively operated to move the apply plate 254 between a first position, in which the first and second clutch plates 122, 130 are frictionally engaged to one another to transmit rotary power from the clutch input member 118 to the clutch output member 126, and a second position in which the first and second clutch plates 122, 130 are disengaged from one another so that rotary power is not transmitted between the clutch input member 118 and the clutch output member 126.

The hydraulic circuit 218 can include a reservoir 262, the actuator 258, a first pump 266, and a second pump 270. The reservoir 262 can be configured to hold a hydraulic fluid and can include a vent 264. The vent 264 can vent to atmosphere or can be configured to selectively vent to atmosphere based on a predetermined pressure of the reservoir 262. The actuator 258 can be fluidly coupled to the first and second pumps 266, 270 and coupled to the apply plate 254 to selectively engage or disengage the clutch 222. The actuator 258 can be a hydraulic ram including a piston 274 and a housing 278 defining a chamber 282. In the example provided, the piston 274 is an annular piston and the chamber 282 is an annular chamber, though it will be appreciated that other configurations can be used. The piston 274 can be movable within the chamber 282 between a first position in which the piston is retracted relative to the first and second clutch plates 122, 130 to disengage the clutch 222, and a second position in which the piston 274 is extended relative to the first and second clutch plates 122, 130 to engage the clutch 222. In the first position, rotary power is not transmitted between the clutch input member 118 and the clutch output member 126. The present teachings also allow for minimizing frictional drag by allowing greater separation of clutch plates 122, 130 than typical actuators. The actuator 258 can have a port 286 for receiving hydraulic fluid into the chamber 282 on a first side 290 of the piston 274. Inputting fluid to the chamber 282 on the first side 290 of the piston 274 can cause the piston 274 to move from the first position to the second position. The piston 274 can also be biased toward the first position by a biasing member (not shown), such as a spring for example. The actuator 258 can have a bleed port 294 coupling the chamber 282 (at the first side 290 of the piston 274) to the reservoir 262. The bleed port 294 can be configured to bleed fluid from the chamber 282 directly to the reservoir 262 at a flow rate that is less than a flow rate of either of the first or second pumps 266, 270. Alternatively, a restriction device 296 can be located between the bleed port 294 and the reservoir 262 to act to ensure a desired flow rate through the bleed port 294.

The first and second pumps 266, 270 can be any type of hydraulic pump, such as a gerotor for example. The first pump 266 can have a displacement less than the second pump 270, while being configured to provide fluid at higher pressures than the second pump 270. In other words, the first pump 266 can be a low-volume, high-pressure pump, while the second pump 270 can be a high-volume, low-pressure pump. The first and second pumps 266, 270 can be coupled to the output shaft 226 to be driven by the motor 214 such that the first and second pumps 266, 270 are simultaneously driven by the output shaft 226. The first pump 266 can have a first port or inlet/outlet 296 and a second port or inlet/outlet 300. The first port 296 can be coupled in fluid communication to the reservoir 262. The second port 300 can be coupled in fluid communication to the chamber 282. When the output shaft 226 rotates in the first direction 230, fluid is drawn from the reservoir 262 into the first pump 266 via the first port 296 and is discharged from the first pump 266 (via the second port 300) at a relatively higher first pressure. The fluid discharged from the second port 300 of the first pump 266 is directed to the chamber 282. When the output shaft 226 rotates in the second direction 234, fluid is drawn from the chamber 282 into the second port 300 and discharged from the first pump 266 via the first port 296. Fluid discharged from the first port 296 can be directed to the reservoir 262.

The second pump 270 can have a third port or inlet/outlet 304 and a fourth port or inlet/outlet 308. The third port 304 can be coupled to the reservoir 262 and the fourth port 308 can be coupled to the chamber 282. When the output shaft 226 rotates in the first direction 230 and a pressure differential between the chamber 282 and the fourth port 308 is less than a first predetermined pressure differential, the second pump 270 can provide fluid to the chamber 282.

A first valve 312 can be located between the fourth port 308 and the chamber 282 to limit fluid flow between the fourth port 308 and the chamber 282. The first valve 312 can be a normally open valve that closes when the pressure differential between the fourth port 308 and the chamber 282 exceeds the first predetermined pressure differential. Thus, when output shaft 226 rotates in the first direction 230 and the pressure differential between the chamber 282 and the fourth port 308 is greater than the first predetermined pressure differential, the first valve 312 blocks flow from the second pump 270 to the actuator 258 and the second pump 270 does not provide fluid to the chamber 282.

An optional second valve 316 can be located between the third port 304 and the reservoir 262. The second valve 316 can be movable between a closed position and an open position. In the closed position, the valve prevents fluid from flowing from the reservoir 262 to the second pump 270, while fluid is allowed to flow in the open position. The second valve 316 can be a check valve such that the valve is open to allow flow only in the direction from the reservoir 262 to the second pump 270, and is closed to flow from the second pump 270 to the reservoir 262. The second valve 316 can alternatively be a normally closed valve with a low crack pressure, such that the second valve 316 moves to the open position when a pressure differential between the third port 304 and the reservoir 262 is greater than a second predetermined pressure differential.

The hydraulic circuit 218 can also include a sub-circuit, or isolation circuit, 320 coupling the third port 304 to the fourth port 308. When the first valve 312 is closed, the second pump 270 cycles fluid within the sub-circuit 320. When the first and second valves 312 and 316 are closed, the second pump 270 cycles fluid within the sub-circuit 320, and the second pump 270 is isolated from the reservoir 262 and the actuator 258 regardless of the rotational direction of the output shaft 226. When the first valve 312 is closed and the second valve 316 is not included, back-pressure between the sub-circuit 320 and the reservoir 262 can act to substantially limit fluid flow between the sub-circuit 320 and the reservoir 262. In this way, the second pump is substantially isolated from the reservoir 262 and the actuator 258 regardless of the rotational direction of the output shaft 226 or the inclusion of the second valve 316.

A third valve 324 can be located in the sub-circuit 320 between the third and fourth ports 304, 308. The third valve 324 can be a normally closed valve to prevent hydraulic fluid from flowing through the sub-circuit 320 from the third port 304 to the fourth port 308, and can open to allow flow through the sub-circuit 320 from the fourth port 308 to the third port 304 when a pressure differential between the third and fourth ports 304, 308 is greater than a third predetermined pressure differential. The third predetermined pressure differential can be greater than the first predetermined pressure differential to prevent the third valve 324 from opening while the first valve 312 is open. For example, when the output shaft 226 rotates in the first direction 230 and the first valve 312 is closed due to the first pressure differential, the second pump 270 can pump fluid from the fourth port 308 through the third valve 324 and back to the third port 304 in a loop through the sub-circuit 320, providing relatively little resistance to the motor 214.

A fourth valve 328 can be located in the sub-circuit 320 between the third and fourth ports 304, 308. The fourth valve 328 can be a normally closed valve to prevent fluid from flowing through the sub-circuit 320 from the fourth port 308 to the third port 304, and can allow flow through the sub-circuit 320 from the third port 304 to the fourth port 308. For example, when the output shaft 226 is rotated in the second direction 234 and the first valve 312 is closed due to the first pressure differential, the second pump 270 can pump fluid from the third port 304 through the fourth valve 328 and back to the fourth port 308 in a loop through the sub-circuit 320, providing relatively little resistance to the motor 214.

Thus a typical operation, starting with the clutch 222 disengaged, can be described. When the motor 214 rotates the output shaft 226 in the first direction 230, the first and second pumps 266, 270 draw fluid from the reservoir 262 and pump the fluid into the chamber 282. Because little fluid pressure is needed to move the piston 274 away from the first position, the piston 274 can be moved relatively quickly from the first position to an intermediate position proximate the second position (i.e., a position in which the first and second clutch plates 122, 130 contact one another but a sufficiently high normal force has not been applied to the first and second clutch plates 122, 130 to permit torque transfer therebetween of a desired magnitude) due to the chamber 282 receiving the high volume of fluid from the combined flow of the first and second pumps 266, 270. When the piston 274 reaches the intermediate position, the first and second clutch plates 122, 130 are engaged to some degree (albeit at a level that is less than required to transmit a desired level of torque therebetween) and further movement of the piston 274 is resisted. The first and second pumps 266, 270 continue to operate to provide fluid to the chamber 282 while the pressure within the chamber 282 rises until the first predetermined pressure differential is reached to close the first valve 312. The first pump 266 can continue to provide high-pressure, low-volume fluid to the chamber 282 to maintain the engagement of the clutch 222. The bleed port 294 can allow a small amount of fluid to bleed from the chamber 282 to prevent over pressurization of the chamber 282 or damage to the first pump 266 or motor 214. The bleed port 294 can also serve to avoid air build-up, and the resulting performance degradation, within chamber 282. The second pump 270 can then cycle fluid with relatively little resistance within the sub-circuit 320, or in the case without the second valve 316, can unload fluid to the reservoir 262 to reduce resistance.

The motor 214 can then be reversed to cause the first pump 266 to pump fluid from the chamber 282 to the reservoir, to begin disengaging the clutch 222. In the case without the second valve 316, once the pressure differential between the fourth port 308 and the chamber 282 drops below the first predetermined pressure differential, the first valve 312 opens and both pumps 266, 270 can operate to remove fluid from the chamber 282. In a hydraulic circuit 218 that includes the second valve 316, the second pump 270 continues to cycle fluid in the sub-circuit 320 until the first valve 312 opens, allowing some fluid to leave the sub-circuit 320 and be returned to the reservoir 262 via the first pump 266.

It is also contemplated that the motor 214, output shaft 266, the first and second pumps 266, 270, the first through fourth valves 312, 316, 324, 328, and the sub-circuit 320 can optionally be located within a single housing 332 mounted to the vehicle, such that the housing 332 has only two ports, 336 and 340, port 336 being coupled to the reservoir and port 340 being coupled to the chamber 282.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A power transmitting component comprising:
   a friction clutch having a plurality of first clutch plates and a plurality of second clutch plates that are interleaved with the first clutch plates;
   a reservoir configured to hold a hydraulic fluid;
   a hydraulic ram coupled to the friction clutch, the hydraulic ram having a chamber and a piston that is movable in the chamber between a first position which is retracted relative to the first and second clutch plates, and a second position in which the piston is extended toward the first and second clutch plates to a greater extent than when the piston is in the first position;
   a motor having an output shaft that is rotatable in a first rotational direction;
   a first pump driven by the output shaft and having a first port coupled in fluid communication to the reservoir, and a second port coupled in fluid communication to the chamber, the first pump having a first displacement and configured to provide hydraulic fluid of a first pressure and first flow rate from the second port when the output shaft rotates in the first rotational direction;
   a second pump driven by the output shaft and having third and fourth ports, the third port being coupled to the reservoir, the fourth port being coupled to the chamber, the second pump provides hydraulic fluid to the chamber when the output shaft rotates in the first rotational direction and a first pressure differential between the chamber and the fourth port is less than or equal to a first predetermined pressure differential, the second pump having a second displacement greater than the first displacement and configured to provide hydraulic fluid of a second pressure and a second flow rate from the fourth port when the output shaft rotates in the first rotational direction, the second pressure being less than the first pressure, and the second flow rate being greater than the first flow rate;
   a first valve between the second pump and the hydraulic ram, the first valve moveable between an open position allowing fluid communication between the second pump and the chamber, and a closed position, fluidly isolating the second pump from the chamber, the first valve is moved from the open position to the closed position when the first pressure differential is greater than the first predetermined pressure differential; and
   a second valve between the third port and the reservoir, the second valve moveable between a closed position preventing fluid communication between the second pump and the reservoir, and an open position allowing fluid communication, the second valve is moved from the closed position to the open position when a second pressure differential between the third port and the reservoir is greater than a second predetermined pressure differential, and the second pump cycles hydraulic fluid in a hydraulic loop isolated from the reservoir and the hydraulic ram when the first and second valves are in the closed position;
   wherein the first and second pumps are simultaneously driven by the output shaft.

2. The power transmitting component of claim 1, further comprising a conduit coupled for fluid communication between the reservoir and the chamber.

3. The power transmitting component of claim 2, wherein the conduit is configured to release hydraulic fluid from the chamber to the reservoir at a third flow rate less than the first and second flow rates.

4. A power transmitting component comprising:
   a friction clutch having a plurality of first clutch plates and a plurality of second clutch plates that are interleaved with the first clutch plates;
   a reservoir configured to hold a hydraulic fluid;
   a hydraulic ram coupled to the friction clutch, the hydraulic ram having a chamber and a piston that is movable in the chamber between a first position which is retracted relative to the first and second clutch plates, and a second position in which the piston is extended toward the first and second clutch plates to a greater extent than when the piston is in the first position;
   a motor having an output shaft that is rotatable in a first rotational direction;
   a first pump driven by the output shaft and having a first port coupled in fluid communication to the reservoir, and a second port coupled in fluid communication to the chamber, the first pump having a first displacement and configured to provide hydraulic fluid of a first pressure and first flow rate from the second port when the output shaft rotates in the first rotational direction;

a second pump driven by the output shaft and having third and fourth ports, the third port being coupled to the reservoir, the fourth port being coupled to the chamber, the second pump provides hydraulic fluid to the chamber when the output shaft rotates in the first rotational direction and a first pressure differential between the chamber and the fourth port is less than or equal to a first predetermined pressure differential, the second pump having a second displacement greater than the first displacement and configured to provide hydraulic fluid of a second pressure and a second flow rate from the fourth port when the output shaft rotates in the first rotational direction, the second pressure being less than the first pressure, and the second flow rate being greater than the first flow rate; and a first valve between the second pump and the hydraulic ram, the first valve moveable between an open position allowing fluid communication between the second pump and the chamber, and a closed position, fluidly isolating the second pump from the chamber, the first valve is moved from the open position to the closed position when the first pressure differential is greater than the first predetermined pressure differential;

wherein the first and second pumps are simultaneously driven by the output shaft; and wherein the output shaft of the motor is rotatable in a second rotational direction opposite the first rotational direction, the first pump pumps hydraulic fluid from the chamber to the reservoir when the output shaft rotates in the second rotational direction, and the second pump circulates hydraulic fluid in a sub-circuit that is fluidly isolate from the hydraulic ram when the output shaft rotates in the second rotational direction and the first valve is in the closed position.

5. The power transmitting component of claim 4, further comprising a second valve between the second pump and the reservoir, the second valve prevents the second pump from pumping hydraulic fluid to the reservoir when the output shaft rotates in the second rotational direction and the first valve is in the closed position.

6. The power transmitting component of claim 5, further comprising a third valve located between the third and fourth ports, the third valve prevents hydraulic fluid from flowing through the sub-circuit from the third port to the fourth port and allows flow through the sub-circuit from the fourth port to the third port when a third pressure differential between the third and fourth ports is greater than a third predetermined pressure differential, the third predetermined pressure differential being greater than the first predetermined pressure differential.

7. The power transmitting component of claim 6, further comprising a fourth valve located between the third and fourth ports, the fourth valve prevents hydraulic fluid from flowing through the sub-circuit from the fourth port to the third port and allows flow through the sub-circuit from the third port to the fourth port.

8. The power transmitting component of claim 4, further comprising a conduit coupled for fluid communication between the reservoir and the chamber.

9. The power transmitting component of claim 8, wherein the conduit is configured to release hydraulic fluid from the chamber to the reservoir at a third flow rate less than the first and second flow rates.

10. A power transmitting component comprising:
a friction clutch having a plurality of first clutch plates and a plurality of second clutch plates that are interleaved with the first clutch plates;
a reservoir configured to hold hydraulic fluid;
a hydraulic ram having a chamber and a piston that is movable in the chamber between a first position, which is retracted relative to the first and second clutch plates, and a second position in which the piston is extended toward the first and second clutch plates to a greater extent than when the piston is in the first position;
an isolation circuit coupled for selective fluid communication to the reservoir and the chamber;
a motor having an output shaft that is driven by the motor in a first rotational direction;
a first pump driven by the output shaft and having a first port coupled in fluid communication to the reservoir, and a second port coupled in fluid communication to the chamber, the first pump having a first displacement and configured to provide hydraulic fluid of a first pressure and first flow rate from the second port when the output shaft rotates in the first rotational direction;
a second pump driven by the output shaft and having third and fourth ports coupled in fluid communication to the isolation circuit, the second pump having a second displacement and configured to provide hydraulic fluid of a second pressure and second flow rate from the fourth port when the output shaft rotates in the first rotational direction, the second flow rate being greater than the first flow rate, and the second pressure being less than the first pressure; and
a first valve between the isolation circuit and the hydraulic ram, the first valve allowing fluid communication between the isolation circuit and the chamber when a first pressure differential between the chamber and the isolation circuit is less than or equal to a first predetermined pressure differential, and preventing fluid communication when the first pressure differential is greater than the first predetermined pressure differential;
wherein the second pump circulates hydraulic fluid in a portion of the isolation circuit when the first pressure differential is greater than the first predetermined pressure differential.

11. The power transmitting component of claim 10, wherein the motor is reversible to drive the output shaft in a second rotational direction that is opposite the first rotational direction, the first pump pumps hydraulic fluid from the chamber to the reservoir when the output shaft rotates in the second rotational direction, and the second pump circulates hydraulic fluid in a portion of the isolation circuit when the output shaft rotates in the second rotational direction and the first pressure differential is greater than the first predetermined pressure differential.

12. The power transmitting component of claim 11, further comprising a second valve, the second valve being between the isolation circuit and the reservoir, the second valve preventing fluid communication from the isolation circuit to the reservoir and allowing fluid communication from the reservoir to the isolation circuit when a second pressure differential between the isolation circuit and the reservoir is greater than a second predetermined pressure differential.

13. The power transmitting component of claim 12, further comprising a third valve located between the third and fourth ports, the third valve preventing flow through the isolation circuit from the third port to the fourth port, and allowing flow through the isolation circuit from the fourth port to the third port when a third pressure differential between the third and fourth ports is greater than a third predetermined pressure differential, the third predetermined pressure differential being greater than the first predetermined pressure differential.

14. The power transmitting component of claim 13, further comprising a fourth valve located between the third and fourth ports, the fourth valve prevents hydraulic fluid from flowing through the isolation circuit from the fourth port to the third port and allows flow through the isolation circuit from the third port to the fourth port.

15. The power transmitting component of claim 10, further comprising a conduit coupled for fluid communication between the reservoir and the chamber.

16. The power transmitting component of claim 15, wherein the conduit is configured to release hydraulic fluid from the chamber to the reservoir at a third flow rate less than the first and second flow rates.

17. A power transmitting component comprising:
a friction clutch having a plurality of first clutch plates and a plurality of second clutch plates that are interleaved with the first clutch plates;
a hydraulic ram coupled to the friction clutch, the hydraulic ram having a chamber and a piston that is movable in the chamber between a first position, which is retracted relative to the first and second clutch plates, and a second position in which the piston is extended toward the first and second clutch plates to a greater extent than when the piston is in the first position;
a reservoir configured to hold a hydraulic fluid;
an isolation circuit;
a motor having an output shaft that is selectively rotatable in a first rotational direction and a second rotational direction that is opposite the first rotational direction;
a high-pressure, low-displacement pump driven by the output shaft, a first input/output of the high-pressure, low-displacement pump being coupled in fluid communication to the reservoir, a second input/output of the high-pressure, low-displacement pump being coupled in fluid communication to the chamber; and
a low-pressure, high-displacement pump driven by the output shaft and having a third input/output and a fourth input/output, the third and fourth input/outputs being coupled in fluid communication with the isolation circuit;

wherein when the output shaft is driven in the first rotational direction and a pressure differential between hydraulic fluid output from the fourth input/output and hydraulic fluid in the chamber is less than or equal to a predetermined pressure differential, the isolation circuit permits fluid communication between the fourth input/output and the chamber and permits fluid communication between the reservoir and the third input/output;

wherein when the output shaft is driven in the first rotational direction and the pressure differential between hydraulic fluid output from the fourth input/output and hydraulic fluid in the chamber is greater than the predetermined pressure differential, the isolation circuit inhibits fluid communication between the fourth input/output and the chamber, and permits fluid communication between the reservoir and the third input/output when a pressure of hydraulic fluid entering the third input/output is less than a second predetermined pressure; and wherein when the output shaft is driven in the second rotational direction, the low-pressure, high-displacement pump recirculates hydraulic fluid within a portion of the isolation circuit.

18. The power transmitting component of claim 17, wherein the isolation circuit includes a normally open valve between the fourth input/output and the chamber to permit the fluid communication between the fourth input/output and the chamber, the pressure differential closes the normally open valve when the pressure differential is greater than the predetermined pressure differential to inhibit fluid communication therebetween.

19. The power transmitting component of claim 17, further comprising a valve between the third input/output and the reservoir to allow flow in the direction from the reservoir to the second pump and prevent flow in the direction from the second pump to the reservoir, wherein the isolation circuit is isolated from the reservoir and the hydraulic ram when output shaft is driven in the second rotational direction and the pressure differential is greater than predetermined pressure differential.

20. The power transmitting component of claim 17, further comprising a bleed conduit fluidly coupled to allow hydraulic fluid to bleed from the chamber directly to the reservoir.

* * * * *